United States Patent [19]
Custer

[11] 3,926,633
[45] Dec. 16, 1975

[54] MOTION PICTURE FILM SOUNDTRACK AND METHOD FOR PRODUCTION THEREOF

[76] Inventor: Peter Anderson Custer, Newtown, Bucks County, Pa. 18940

[22] Filed: July 2, 1973

[21] Appl. No.: 375,812

[52] U.S. Cl. .................. 96/68; 96/4; 96/39
[51] Int. Cl.² ... G03C 1/76; G03C 7/24; G03C 5/14
[58] Field of Search ........ 96/4, 39, 68, 69; 352/233, 352/239; 353/19, 120

[56] References Cited
UNITED STATES PATENTS

| | | |
|---|---|---|
| 2,246,013 | 6/1941 | Schinzel et al ............................. 96/4 |
| 2,403,722 | 7/1946 | Jelley et al ............................. 96/69 |
| 2,887,379 | 5/1959 | Blake et al ............................. 96/68 |
| 3,379,095 | 4/1968 | Kaprelian ............................. 352/37 |
| 3,782,947 | 1/1974 | Krall ......................................... 96/4 |
| 3,801,324 | 4/1974 | Postal ................................... 96/68 |

*Primary Examiner*—Mary F. Kelley
*Attorney, Agent, or Firm*—Fidelman, Wolffe & Leitner

[57] ABSTRACT

A motion picture film having a soundtrack which is visible light-transparent, but fluoresces in the visible spectrum when submitted to ultra-violet radiation, an unexposed film for providing the product, and the method for producing the exposed and unexposed films including such soundtrack.

5 Claims, 3 Drawing Figures

MOTION PICTURE FILM SOUNDTRACK AND METHOD FOR PRODUCTION THEREOF

BACKGROUND OF THE INVENTION

The present invention is directed to a motion picture film wherein a layer containing a colorless, transparent ultra-violet light sensitive soundtrack is provided on one side of the film. The soundtrack covers the whole of either the front or back of the film and may be either variable density or variable area type. The present invention is further directed to the use of a second emulsion to record a soundtrack on a film and the subsequent development thereof to produce a soundtrack which is colorless and transparent to visible light, but fluoresces in the visible light spectrum when exposed to ultra-violet light.

Generally, in the prior art it has become standard procedure to provide a magnetic or optical recording track on the edge of a film adjacent the image when producing sound in motion pictures. However, this system is quite cumbersome since the provision of the soundtrack is an operation that is separate from the recording and developing operation. The width of the track, on the other hand, is a further limiting factor since it can only be on an area not covered by the photographic image, and thus must be very narrow due to the width of the film. Further, when utilizing narrow films such as those that have become quite popular for amateur movie makers, e.g., the "Super-8" films, there is not sufficient space on the film to provide a reasonable soundtrack, e.g. good signal to noise ratio, frequency response and high information density. The present invention, on the other hand, provides a film and a method of using such film that admits of recording the sound on the full width of a film, especially on 8-millimeter film, and thus provides improved reproduction of the sound.

In U.S. Pat. No. 3,379,095 it was suggested that a filmstrip have the sound recording over the picture thereof. However, in the method suggested therein, a complex light-dividing system was necessary in order to provide both sound and image. Further, the materials utilized therein, although being transparent to visible light, were opaque to infra-red radiation and thus required the light-splitting techniques. The present invention, on the other hand, overcomes the expensive additional equipment required by such a system. These infra-red opaque coatings have to be placed on the film after the development thereof and do not appear to be applicable to almost simultaneous picture and sound recording. Thus, the process requires two steps to complete the recordings and requires additional equipment expenditure.

Further it is known to use various light systems, e.g. the system shown in U.S. Pat. No. 1,928,329 to Oswald et al, and U.S. Pat. Nos. 3,508,015 and 3,522,388 to Miller. However, these systems apparently do not recognize the possiblity of recording both sound and images on the same film. The patent to Oswald uses a black and white film and visible light through a lens to provide the sound system while the patents to Miller utilize light emitting diodes of varying types. The systems thus suffer from the same lack of ease of good sound reproduction present in the magnetic strip type of sound recording.

Further, the art generally accomplishes multiple sound source effects by using separate, but synchronously run, film strips or magnetic tape. These systems present serious technical problems such as maintaining both sound and film image synchronization between the two separately run systems. This film may be of the standard 16mm, 35 or 70mm size. There is at present usually only room for one channel of sound on the rebate edge next to the image area of these commercial films. In the present invention and use, soundtracks, formed of a transparent, colorless ultra-violet fluorescent material, are superimposed over the actual image area. One ultra-violet soundtrack exciter source may serve to energize, or cause to fluoresce all of the soundtracks, but each track must be read out by a separate photosensitive cell.

Thus, it is an object of the present invention to provide a film which may be first exposed to visible light to produce a photographic image and then almost simultaneously exposed to infrared radiation to produce a soundtrack on the exposed film.

A further object of the present invention is to provide a finished film that has sound recording on the full width thereof and requires only a minimum of extra equipment to reproduce this sound.

Another object of the present invention is the provision of a high gain, high signal to noise ratio, variable density or variable area soundtrack.

It is an even further object to provide a simple method of reproducing sound on motion picuture film which admits of recording by amateur photographers.

A further object of the invention is to provide means for the recording of multiplicity of synchronized soundtracks or channels on a single motion picture film release print and thus create, in the theatre, sterophonic or quadraphonic sound effects.

A still further object of the invention is to provide retrieval instructions on film to be used in automatic information retrieval systems, the filing instructions being placed over the useable image area of microchips and the like in a second emulsion which develops to become a transparent, colorless, ultra-violet, fluorescent material, and thus retrieval instructions do not obscure or use space that would otherwise be available for the recording and storage of other data.

SUMMARY OF THE INVENTION

The present invention is directed to black and white or color photographic films having additionally coated thereon an emulsion of visible light insensitive material. This film is used by first exposing it in a normal manner to the desired image and then almost simultaneously exposing the visible light insensitive emulsion, e.g. when using an infra-red sensitive emulsion, to infra-red light emitted from a light-emitting diode of a selected type, to provide the soundtrack. The film, after these two exposures, may be then developed in what is almost a normal manner to provide the visual images, while the soundtrack portion is developed with a colorless, visible light-transparent ultra-violet light sensitive, visible light-emitting dye. In the alternative, the ultra-violet light sensitive dye may be contained in the sound track producing emulsion, and the development thereof effected by washing the unexposed areas off of the layer. The actual development procedure used may be varied as desired, e.g. separate steps or a combined process, so long as the film product has both the usual images and the transparent colorless U.V. sensitive dye soundtrack.

DESCRIPTION OF THE DRAWINGS

The following Figures will serve to schematically illustrate one embodiment of the present invention.

DESCRIPTION OF THE PREFERRED EMBODIMENTS

Figure 1:
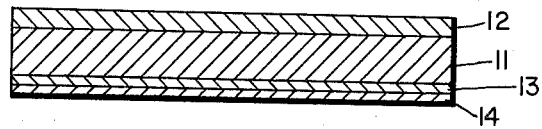
FIG. 1 is a cross-section of the film of the present invention in the unexposed state.

FIG. 1 shows a normal black and white or color film having a base 11 which may be of any normal material such as polyethylene terephthalate and a visible light-sensitive emulsion 12 which may be either black and white or color. That is, the film of the present invention may be adaptable for either black and white films or color films. Further, the particular type of development required, such as, dye coupling, etc. is not critical. That is, the film of the present invention may have any desired light-sensitive emulsion coated thereon. The film shown in FIG. 1 has an anti-halation layer 13 and, coated on the back thereof, the unexposed emulsion of the present invention. This sound track forming emulsion 14 contains normal emulsion components, e.g. it may be a silver halide in gelatin emulsion and contain the sound producing photo-sensitive material which may be, e.g. the visible light-sensitive material discussed below. Additionally, an infra-red light absorber may be present between the base and emulsion 14.

Although it is preferred that the sound emulsion be on the back of the film, it is also possible to put this emulsion on the front, i.e. overcoat the visible emulsion with the sound emulsion. The provision of the sound emulsion on the same surface as the image emulsion requires special processing since, e.g., development requiring transfer of material through the sound emulsion could create a loss in quality of sound reproduction. Thus, while any processing compatible with the original sound recording emulsion and the final U.V. sensitive dye containing sound track may be utilized for developing the soundtrack on the back of the film (such as diffusion transfer, dye coupling, etc.) when the sound track is coated over the image producing emulsion, the developed image surface should be smooth so that no sound distortion problems would arise.

The image producing emulsion used in the present invention may be provided by numerous methods, one of these being the process for high speed laying of gelatin coatings disclosed in U.S. Pat. No. 3,617,292. Further, the emulsions are those known in the art and include emulsions such as the high contrast emulsion of U.S. Pat. Nos. 3,625,689 and 3,635,715. Also, anti-halation and subbing layers useful in the conventional portions of the film of the present invention are those presently in use. An exemplary subbing layer can be found in U.S. Pat. No. 3,645,740. The present invention, on the other hand, resides in the provision and use of an emulsion coating that is capable of recording signals from a light source other than one emitting visible light and which can be developed with a dye which fluoresces in the visible light spectrum when subjected to ultra-violet light.

Figure 2:
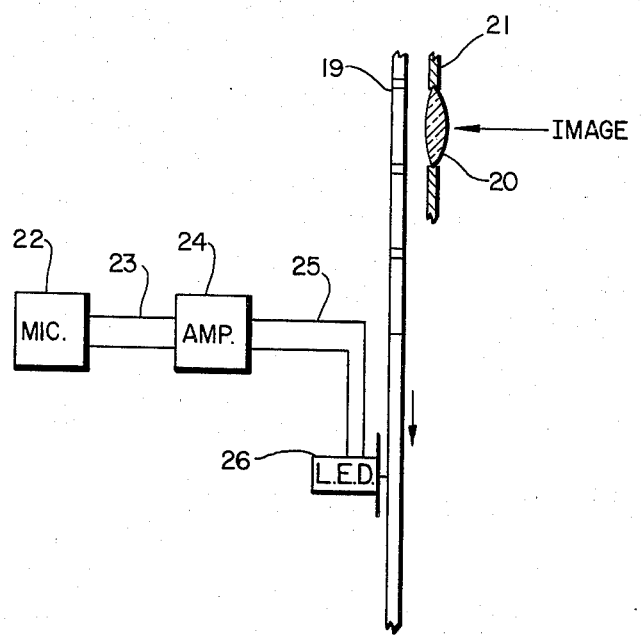
FIG. 2 is a schematic of the exposure system of the present invention.

In FIG. 2, the process of the present invention is illustrated. In this system, the film (indicated generally as 19) is exposed through lens 20 in the camera indicated generally as 21. Simultaneously the sound associated with the image is picked up by microphone 22, transmitted by lines 23 to optional amplification system 24 and then by wires 25 and diode 26. The output of diode 26 is used to expose the sound emulsion. This exposure is effected at a point on the film that has been previously exposed to visible light, e.g. 24 frames ahead of the associated visual image in 8mm films. Additionally, in use a sound loop is needed to utilize the film since the intermittent motion of the film during recording would make sound recording impossible. Thus, a film having a visual image spaced 24 frames behind the sound associated with it is produced. This spacing can be used in the visual and sound reproduction of the films since it allows spacing between the audio and visual reproducing means in a projector. The type of amplification system utilized depends on the type of diode selected. That is, if the microphone in conjunction with a single stage amplifier provides sufficient voltage to drive diode 26 in the linear area, then no further amplification is necessary. However, if this is not the case, a more powerful amplification circuit may be provided at 24. Power for the amplification system can easily be provided by the power source for the camera. The preferred diodes are infrared emitters such as galium arsenide and a structure therefor may be found in U.S. Pat. No. 3,522,388 cited above. Further, light emitting diodes including split projection diodes and those of the general types shown in U.S. Pat. Nos. 3,293,513 and 3,576,586 may be utilized in the present invention. However, other diodes may be utilized so long as they do not emit radiation in the visible spectrum. Obviously, the sensitivity of the sound emulsion used is determined by, e.g., the diode used and infra-red sensitive sound emulsions being used in combination with infra-red emitters. Further, the structure controlling the characteristics of the diode output in the sound reproduction portion of the present invention may be the type producing a variable area output or a variable density output. If the film is of the 8mm type, a variable density system is preferred, while if wider films are used, variable area systems are preferred. The variable area recording produces a light pattern that varies with the signal's characteristics, while variable density recordings have a varying intensity of recording signal over a fixed area. The diode is in proximity to the film and the synchronization of the sound track recording and visible light recording is done for example, by gear and electronic means, not shown. An exemplary structure for this system may be found in applicant's copending application Ser. No. 375,638, filed concurrently herewith and entitled Motion Picture Camera, Cartridge and Data Recording System.

Additionally, visible light emitting diodes, if available, may be utilized in the recording step if a blocking layer is used between the image emulsion and the sound emulsion to prevent exposure of the sound emulsion during image recording and vice versa. In this form, the sound emulsion is on the opposite side of the film and a temporary visible, light absorbing dye layer is placed, between the film base and the sound emulsion. This dye is removed, e.g. by bleaching it out during development. Thus the important feature of the sound emulsion is that it be adaptable to recording of the sound without interfering with, or being interfered with by, the visual image emulsion recording step.

Figure 3:
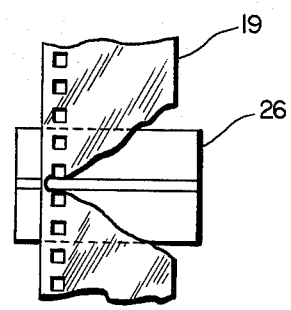
FIG. 3 is a partially sectionalized view of the sound recording system of the present invention.

FIG. 3 shows a partial section of the system wherein film 19 passes in front of diode 26 and has the sound "image" recorded thereon. In a typical system, the sound recording is done at a point 24 frames away from the image recording. Thus a given image has associated therewith the sound for a frame which would be shown on the motion picture screen 24 frames later. Thus the recording of both the image and the sound may be synchronized for use in a motion picture projector.

After exposure, the film of the present invention is then developed in accord with known techniques as to the visible image. However, these development processes must be so limited that they do not interfere with the development and dye formation in the soundtrack. The soundtrack, on the other hand, after exposure is developed by normal known techniques e.g. in developing and fixing baths, and the soundtrack formed by using any substance with the property of being transparent and colorless in visible light, but fluorescent in the visible spectrum when exposed to ultra-violet light, and e.g. dyeing or dye coupling development processing.

In the alternative, the optical brightener may be included in the soundtrack forming emulsion and a "wash off relief" process used. In this embodiment, the soundtrack emulsion includes the infra-red, visible or other light sensitive material and the variable area or variable density sound recording effected thereon hardens the gelatin emulsion allowing development by washing the unexposed emulsion off the film. An exemplary system is that known as the tanning developer which hardens the emulsion by e.g. oxidation of pyrocatechin.

These optical brighteners are essentially colorless, ultra-violet light sensitive and visible light fluorescing and are transparent to visible light. When the dye is present on the back of the film, it appears that the final concentration in the dry emulsion should be from about 0.01 to 0.20 by weight based on the coating solids. Preferably, however, the dye is present in an amount of from 0.05 to 0.15 percent and it appears most preferable to have dye concentration about 0.14 percent. However, the concentration can vary outside of these limits depending on such factors as dye fluorescent efficiency. The only requirement is that the dye fluoresce with sufficient intensity to allow easy discrimination by e.g. a photoelectric cell. All of these percentages are by weight based on the coating. These coatings are the normal thickness, i.e. from about 0.0001 to about 0.0005, preferably about 0.0002 to about 0.0004 inches and are made from normal emulsions such as silver halide gelatin emulsions. Exemplary emulsions include those known throughout the art. A relatively full study of the photographic skill needed to produce the process and product of the present invention, as to the known components, can be found in "The Theory of the Photographic Process," by .C. E. Kenneth Mees, which disclosure is herewith incorporated by reference. Exemplary of the materials utilized in the emulsions of the present invention include gelatin and water. The photo resist soundtrack emulsion may include e.g. any known visible light sensitive material or MIR sensitive material, while the ultra-violet sensitive materials of the present invention include the Leucophore series produced by Sandoz, Inc. Exemplary of these Leucophore dyes are Leucophore WS., PAF, EFR, and BSB. These dyes are what are commonly known as "optical brighteners" utilized to increase the apparent whiteness of certain fabrics caused by their ultra-violet light sensitive, visible light fluorescing characteristics.

Exemplary infrared sensitizing materials that may be used to provide the soundtrack of the present invention are 1) 3,3'-diethylthiatricarbo-cyanine iodide, 2) Neocyanine, 3) 1,1'-diethyl-4,4'-tricarbo-cyanine iodide, (xenacyanine) and 4) 12-acetoxy 3,3'-diethylthiatricarbo-cyanine perchlorate. All of these materials produce sensitivities between about 80 and 100 A wavelengths and are infrared sensitizers. In this form an IR absorber is needed between the two emulsions in the films of the present invention to protect the IR sensitive emulsion during exposure of the visible image producing emulsion. When using the IR sensitive layer, the material should be present in amounts of from about 0.001 to about 0.50 percent by weight, preferably about 0.001 to about 01. percent by weight, based on the soundtrack producing emulsions solids content.

The film of the present invention may be used, for example, in a "Super 8" camera having included therein the infrared emitting diode and sound amplification system and further having, in the cartridge thereof, as disclosed in the above-noted application, a sound loop, a speed controlling means and the other necessary cartridge components. When used therein or in other motion picture films, both black and white and color film may be utilized and such films may be known types including, e.g., color reversal positive development, or dye adsorption films. Further, this system is adaptable for use in any other camera systems wherein sufficient space is available for the sound recording components of the present system. That is, they may be even used in the commercial films utilized in making motion pictures. In this light, the sound tracks of the present invention may be used in commercial films to provide plural sound tracks of very good characteristics. However, it should be noted that when the product of the present invention is to be duplicated the high speed of such duplicating processes requires the use of higher intensity sound recording light. Thus, when an IR sensitive emulsion is used, an injection laser of the type known as an IR emitting gallium arsenide injection laser should be used. Additionally, the film of the present invention may be an X-ray film wherein the sound track thereof is utilized to provide other data on the patient being filmed.

The following examples are included in the present invention as illustrative of the processes and products of the present invention. However, they are to be considered as illustrative only and not limiting thereon.

EXAMPLE I

Normal 8-millimeter color films are utilized, and the backs thereof are additionally coated with emulsions containing 0.5 percent of a commercially available infra-red sensitive material. This emulsion is then dried and exposed to infra-red light emitted by a biased gallium arsenide semiconductor. After exposure, the films are developed in baths containing an optical brightener in amounts of from 0.05 to 0.25 percent by weight. The resultant ultra-violet light sensitive sound recording produced the best light fluorescence when the solution contained abouve 0.14 percent, actual brighteners, i.e. the coating remains colorless, but had the maximum fluorescence.

EXAMPLE II

Emulsions containing from 0.001 to 1.00 percent Leucophore WS (a trademarked optical brightener available from Sandoz) were coated on glass sheets to determine optimum dye concentrations. The sheet with 0.14 percent dye thereon was found, by visual observation, to emit more visible light when subjected to ultraviolet radiation than coatings of higher and lower concentrations of optical brighteners.

EXAMPLE III

8mm film having a previously provided normal black and white image forming emulsion is coated on the back with a gelatin in water emulsion containing about 0.10 percent by weight neocyanine, based on total solids, dried and exposed to both visible light and infrared radiation from a gallium arsenide diode to expose the image forming and sound recording emulsions respectively in a motion picture camera. The exposed film is then developed by developing, washing and fixing and the IR layer dyed with Leucophore WS (Trademark). The resultant sound reproduction is better than magnetic strip sound reproduction, is synchronized and has equivalent image reproduction.

What is claimed:

1. A photographic film comprising a base, a visible light sensitive silver halide emulsion layer and an infrared sensitive silver halide emulsion soundtrack layer, said soundtrack layer containing an ultra-violet fluorescent compound.

2. The photographic film of claim 1 wherein the soundtrack layer silver halide emulsion contains from 0.0001 to 0.50 percent by weight of an IR sensitizing material selected from the group consisting of 1) 3,3'-diethylthiatricarbocyanine iodide, 2) Neo-cyanine, 3) 1,1'-diethyl-4,4'-tricarbocyanine iodide, and 4) 12-acetoxy-3,3'-diethylthiatricarbocyanine perchlorate.

3. The photographic film of claim 1 wherein an infrared absorbing layer is interposed between the photographic emulsion layer and the soundtrack emulsion layer.

4. The photographic film of claim 1 wherein the visible light sensitive silver halide emulsion layer is of the color image forming type.

5. The photographic film of claim 1 wherein the light sensitive silver halide emulsion layer and the soundtrack layer are on opposite sides of the base.

* * * * *